United States Patent

[11] 3,630,474

[72] Inventor  Ray C. Minor
             Abingdon, Va.
[21] Appl. No. 64,699
[22] Filed    Aug. 18, 1970
[45] Patented Dec. 28, 1971
[73] Assignee Kearney-National Inc.
             New York, N.Y.
             Continuation-in-part of application Ser. No.
             12,358, Feb. 18, 1970, now abandoned.
             This application Aug. 18, 1970, Ser. No.
             64,699

[54] BREAKAWAY POLE SUPPORT STRUCTURE
     7 Claims, 5 Drawing Figs.
[52] U.S. Cl..................................... 248/158,
                              52/98, 52/295, 94/1.5
[51] Int. Cl..................................... E04b 1/41
[50] Field of Search........................... 248/158;
     94/1.5; 52/98, 294, 295; 285/2, 1, 3, 4; 287/DIG. 3

[56]         References Cited
         UNITED STATES PATENTS
3,521,413  7/1970  Scott et al...................... 52/98
  803,373 10/1905  Tyler............................ 52/295 X
2,267,533 12/1941  O'Brien.......................... 285/2
2,240,427  4/1941  Thomsen.......................... 52/295 X
3,002,775 10/1961  Mueller et al.................... 285/2 X Primary Examiner—J. Franklin Foss
Attorney—Mason, Fenwick & Lawrence ABSTRACT: A breakaway support system for a light pole in which a pole base is connected by four elongated breakaway connector members each formed with a tapered conical flange base threaded onto bolts of a foundation with an elongated body portion extending from the base for connection to the base member of a pole with the body portion being divided by an annular circumferential recess providing a weakening along which a break occurs in the event the pole is subjected to a predetermined force.

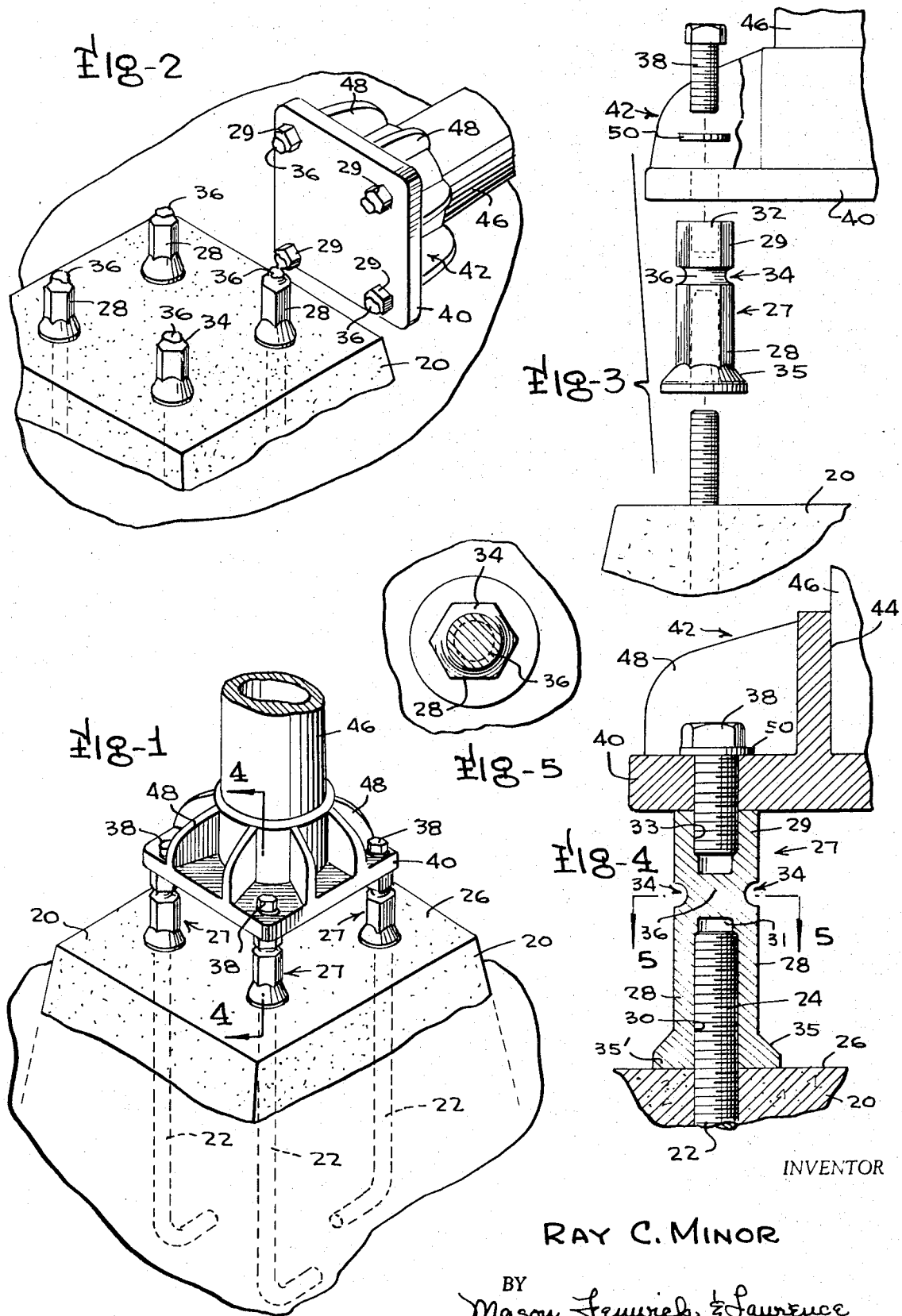

BREAKAWAY POLE SUPPORT STRUCTURE

This application is a continuation-in-part of earlier filed application, Ser. No. 12,358 for Breakaway Pole Support Structure which was filed on Feb. 18, 1970 now abandoned.

This invention is in the field of breakaway support members and is specifically directed to a breakaway-type system for supporting an elongated member such as a lightpole or the like. Moreover, the invention is also directed to a system which can be operated in presently known lightpole installations for providing a breakaway pole support in place of a preexisting nonbreakaway system.

It has become increasingly apparent during recent years that many avoidable fatalities resulting from automobile accidents are caused by the collision of automobiles with fixed lightpoles, traffic signs and sign supporting poles which are of such great strength as to remain in position even after they have been struck by an automobile or other vehicle traveling at a high rate of speed. These fatalities could easily be avoided if the pole members were provided with support means which would break away upon being subjected to a predetermined impact.

Consequently, it has increasingly apparent that there is a great need for a pole construction capable of providing only limited resistance to the impact of an automobile or other vehicle colliding with the pole. Numerous constructions have been proposed for this purpose; however, the prior art systems have not provided satisfactory solutions to the problem. The parent application of this application represents an answer to the many problems of the prior art devices; however, the present application application the provides a still further improvement over the prior known devices. Specifically, it has been found that some installations of breakaway couplings have been subjected to substantial bending loads in addition to sheer and tension loads. Failure due to bending loads on couplings of the type disclosed in the embodiment of this invention of the parent application have sometimes resulted in damage to the pole base support and to the anchor bolts in the foundation from which the couplings extend.

Therefore, it is the primary object of this invention to provide a new and improved pole-supporting system capable of use both in new installations and in old installations for providing a breakaway-type pole support system.

The manner in which the objects of this invention are obtained will be better understood by reference to the following written description and drawings in which:

FIG. 1 is a perspective view of the preferred embodiment;

FIG. 2 is a perspective view illustrating the parts following breakage of the connecting members;

FIG. 3 is an elevational view with portions removed of the preferred embodiment;

FIG. 4 is a sectional view taken along lines 4—4 of FIG. 1; and

FIG. 5 is a sectional view taken along lines 5—5 of FIG. 4.

Attention is initially invited to FIG. 1 of the drawings which illustrates an installation of the preferred embodiment of this invention. A supporting foundation 20 in the form of a concrete member is provided for supporting the other elements of the preferred inventive concept. For this purpose, a plurality of anchor bolts 22 are embedded in the foundation 20 to extend vertically from the foundation with threads 24 being provided upon the lower ends of the bolts 22 above the upper surface 26 of the foundation.

A plurality of elongated breakaway connector members 27 are in the form of an elongated element divided into a lower or major portion 28 and upper or minor portion 29. Threads 30 are provided adjacent the lower end of a lower bore 31 extending substantially the entire length of the lower portion 28. It should be noted that the lower portion 28 is separated from the upper portion 29 by a radially inwardly extending circumferential recessed groove 34 extending about the periphery of the connector member.

The upper portion 29 is provided with a downwardly extending axial bore 32 which extends downwardly from the upper end of the elongated member and which is provided with threads 33 along the major portion of its extent. The lower threads 30 are threaded onto the threaded portion 24 of the anchor bolts 20 so that a connector member is fixedly attached to each of the anchor bolts.

Each of the elongated breakaway connector members 27 is hexagonal in cross-sectional configuration and is provided with the aforementioned circumferential recessed groove 34 extending about its periphery to provide an area 36 of weakened strength in comparison to the remainder of the elongated member and which separates the upper portion 29 from the lower portion 28.

The upper end of the axial bore 32 receives a retainer bolt 38 which is threaded into threads 33 and extends downwardly through an aperture adjacent the corner of a baseplate 40 of a pole support base 42. The pole support base 42 additionally includes a cylindrical socket 44 into which is received a lower end of the pole 46. Pole 46 is normally welded to the socket 44 for retention therein. A plurality of radially extending brace flanges 48 are connected to the outer wall of the cylindrical socket 44 and baseplate 40 for providing rigidity.

Tightening of the retainer bolts 38 clamps the baseplate 40 of the pole support base 42 onto the upper end portions 29 of the four elongated breakaway connector members 27 in an obvious manner. A washer 50 is normally located above the upper surface of the baseplate 40 for providing an additional area under the head of the retainer bolt 38 to bear against the baseplate.

Lower portion 28 of the connector member is formed with a conical support or base flange extending outwardly and comprising a conical surface 35 which is oriented at approximately 45 degrees with respect to the axis of member 27. Additionally, the lowermost portion of the conical support or base flange is formed of a cylindrical surface 35' which is concentric with respect to the axis of the member 27. A rounded connection is provided between the conical surface 35 and the cylindrical surface 35' as is best shown in FIG. 4.

The conical support flange provides enhanced resistance to bending forces to which the connector member may be subjected and consequently eliminates failures of the type previously discussed as have occurred due to such bending forces. For example, the conical support flange obviously provides enhanced resistance to bending movement of the connector which would possibly result in compression failure of the lower end edges of member 27 and resultant bending of the rods 22. Such bending is obviously undesirable since it might well create the necessity for replacing foundation 20 etc. Moreover, prevention of rotative movement of the element 27 caused by bending loads also prevents failure of plate 40 through the breaking off of the corner portions of the plate. In these respects, the inventive embodiment of this application provides improved results over the embodiment of the parent application. This is true because all failures (breakage) of the connector member occur in the reduced or weakened section 36 of the connector member. Consequently, impact of an automobile or the like with the pole 46 at sufficient velocity causes the connector members to break in the area 36 to completely free the pole from the supporting foundation 20 in the manner best illustrated in FIG. 2.

It should be understood that the pole base support 42, etc., is conventional and is normally attached to the foundation in the nature of foundation 20 by placing the baseplate 40 over the upper end of the anchor bolts and then tightening a nut onto the threads on the anchor bolt to clamp the plate 40 in position. Therefore, the employment of the elongated breakaway members 27 enables the conversion of such prior existing installations into a breakaway installation in a remarkably quick and convenient manner. Additionally, the system of this invention can also be employed in a new installation with great ease and facility.

Another significant aspect of the subject invention is that it enables the repair of an installation following the breakage of the member as shown in FIG. 2 since the broken components can easily be removed and replaced in an obvious manner in a mere matter of minutes.

I claim:

1. A breakaway pole support system for enabling a pole to break away from a supporting foundation means when subjected to a predetermined impact, said system comprising a pole base connected to one end of said pole, a plurality of breakaway connector members extending between said pole base and said foundation for connecting said pole base to said foundation, said connector members each comprising a unitary elongated member extending between a lower end abuttingly engaging said foundation and an upper end abuttingly engaging the lower surface of said pole base, a conical support flange extending radially from the lower end of said unitary elongated member for abutting engagement with said foundation, a bore extending inwardly from each end of said unitary elongated member and provided with threads for receiving anchor bolts extending from said foundation means on the lower end of said elongated member and for receiving one of a plurality of retaining bolts extending from said pole base on the upper end of said unitary elongated member.

2. The invention of claim wherein said elongated member includes a body portion divided into major and minor sections by a radially inwardly extending arcuate peripheral groove.

3. The invention of claim 2 wherein said body member is of hexagonal cross-sectional shape.

4. The invention of claim 3 wherein said conical flange includes a surface having a 45-degree inclination with respect to the axis of said elongated member.

5. The invention of claim 4 wherein said bore comprises a main section bore extending inwardly from the lower end of said elongated member and a minor section bore extending inwardly from the upper end of said unitary elongated member.

6. The invention of claim 5 wherein said circumferential groove is positioned approximately one-third of the length of the unitary elongated member inwardly from the upper end of said unitary elongated member.

7. The invention of claim 6 wherein said base flange terminates at its lowermost end position in a cylindrical portion.

* * * * *